(12) United States Patent
Calahan et al.

(10) Patent No.: US 11,868,453 B2
(45) Date of Patent: Jan. 9, 2024

(54) SYSTEMS AND METHODS FOR CUSTOMER AUTHENTICATION BASED ON AUDIO-OF-INTEREST

(71) Applicant: Verint Americas Inc., Alpharetta, GA (US)

(72) Inventors: Marc Adam Calahan, Milton, GA (US); Timothy Andrew Furnell, Burghfield Common (GB); Jamie Richard Williams, Fleet (GB)

(73) Assignee: Verint Americas Inc., Alpharetta, GA (US)

( * ) Notice: Subject to any disclaimer, the term of this patent is extended or adjusted under 35 U.S.C. 154(b) by 221 days.

(21) Appl. No.: 16/676,690

(22) Filed: Nov. 7, 2019

(65) Prior Publication Data

US 2021/0141879 A1 May 13, 2021

(51) Int. Cl.
*G06F 21/31* (2013.01)
*G06F 21/32* (2013.01)
(Continued)

(52) U.S. Cl.
CPC ............. *G06F 21/32* (2013.01); *G10L 17/00* (2013.01); *G10L 17/14* (2013.01); *H04M 3/42068* (2013.01)

(58) Field of Classification Search
CPC ......... G10L 15/26; G10L 15/22; G10L 17/00; G10L 15/30; G10L 15/1822; G10L 13/08;
(Continued)

(56) References Cited

U.S. PATENT DOCUMENTS 4,653,097 A 3/1987 Watanabe et al.
4,823,380 A 4/1989 Kohen et al.
(Continued)

FOREIGN PATENT DOCUMENTS

DE 202008007520 8/2008
EP 0598469 5/1994
(Continued)

OTHER PUBLICATIONS

International Search Report and Written Opinion, dated Jan. 22, 2021, received in connection with International Patent Application No. PCT/US2020/054678.
(Continued)

*Primary Examiner* — Olujimi A Adesanya
(74) *Attorney, Agent, or Firm* — Meunier Carlin & Curfman LLC (57) ABSTRACT

In one embodiment, certain words or phrases spoken by customers during calls to a call center are used to identify or authenticate the user. Words or phrases such as a customer's name, or an account number or telephone number, are selected for a customer. Recordings of the selected words or phrases spoken by the customer during previous calls are used to generate voiceprints that are stored and associated with the customer. Later, when the customer calls the call center, instances of the customer speaking the selected words are extracted from the call (referred to herein as "audio-of-interest") and are compared against the voiceprints stored for the customer. If the voiceprints match the audio-of-interest the customer is authenticated.

19 Claims, 5 Drawing Sheets

(51) Int. Cl.
*G10L 17/00* (2013.01)
*G10L 17/14* (2013.01)
*H04M 3/42* (2006.01)

(58) Field of Classification Search
CPC ... G10L 15/00; G10L 17/14; G10L 2015/088;
H04M 2201/40; H04M 3/42221; H04M
1/271; H04M 3/4936; H04M 2201/41;
H04M 3/2218; G06F 21/32; G06F 40/30
See application file for complete search history.

(56) References Cited

U.S. PATENT DOCUMENTS

| | | |
|---|---|---|
| 4,864,566 A | 9/1989 | Chauveau |
| 4,930,888 A | 6/1990 | Freisleben et al. |
| 5,027,407 A | 6/1991 | Tsunoda |
| 5,222,147 A | 6/1993 | Koyama |
| 5,293,452 A | 3/1994 | Picone et al. |
| 5,638,430 A | 6/1997 | Hogan et al. |
| 5,805,674 A | 9/1998 | Anderson, Jr. |
| 5,907,602 A | 5/1999 | Peel et al. |
| 5,946,654 A | 8/1999 | Newman et al. |
| 5,963,908 A | 10/1999 | Chadha |
| 5,999,525 A | 12/1999 | Krishnaswamy et al. |
| 6,044,382 A | 3/2000 | Martino |
| 6,145,083 A | 11/2000 | Shaffer et al. |
| 6,266,640 B1 | 7/2001 | Fromm |
| 6,275,806 B1 | 8/2001 | Pertrushin |
| 6,421,453 B1 * | 7/2002 | Kanevsky ............ G06F 21/316 340/5.2 |
| 6,427,137 B2 | 7/2002 | Pertrushin |
| 6,480,825 B1 | 11/2002 | Sharma et al. |
| 6,510,415 B1 | 1/2003 | Talmor et al. |
| 6,539,352 B1 | 3/2003 | Sharma et al. |
| 6,587,552 B1 | 7/2003 | Zimmerman |
| 6,597,775 B2 | 7/2003 | Lawyer et al. |
| 6,915,259 B2 | 7/2005 | Rigazio |
| 7,006,605 B1 | 2/2006 | Morganstein et al. |
| 7,039,951 B1 | 5/2006 | Chaudhari et al. |
| 7,054,811 B2 | 5/2006 | Barzilay |
| 7,106,843 B1 | 9/2006 | Gainsboro et al. |
| 7,130,800 B1 | 10/2006 | Currey et al. |
| 7,158,622 B2 | 1/2007 | Lawyer et al. |
| 7,212,613 B2 | 5/2007 | Kim et al. |
| 7,299,177 B2 | 11/2007 | Broman et al. |
| 7,386,105 B2 | 6/2008 | Wasserblat |
| 7,403,922 B1 | 7/2008 | Lewis et al. |
| 7,539,290 B2 | 5/2009 | Ortel |
| 7,657,431 B2 | 2/2010 | Hayakawa |
| 7,660,715 B1 | 2/2010 | Thambiratnam |
| 7,668,769 B2 | 2/2010 | Baker et al. |
| 7,693,965 B2 | 4/2010 | Rhoads |
| 7,778,832 B2 | 8/2010 | Broman et al. |
| 7,822,605 B2 | 10/2010 | Zigel et al. |
| 7,908,645 B2 | 3/2011 | Varghese et al. |
| 7,940,897 B2 | 5/2011 | Khor et al. |
| 8,036,892 B2 | 10/2011 | Broman et al. |
| 8,073,691 B2 | 12/2011 | Rajakumar |
| 8,095,372 B2 | 1/2012 | Kuppuswamy et al. |
| 8,112,278 B2 | 2/2012 | Burke |
| 8,145,562 B2 | 3/2012 | Wasserblat et al. |
| 8,253,797 B1 | 8/2012 | Maali et al. |
| 8,311,826 B2 | 11/2012 | Rajakumar |
| 8,510,215 B2 | 8/2013 | Gutierrez |
| 8,515,025 B1 | 8/2013 | Hewinson |
| 8,537,978 B2 | 9/2013 | Jaiswal et al. |
| 8,566,904 B2 | 10/2013 | Pizano et al. |
| 8,887,269 B2 | 11/2014 | Teglia |
| 9,001,976 B2 | 4/2015 | Arrowood |
| 9,172,808 B2 * | 10/2015 | Zeppenfeld ......... H04M 3/5183 |
| 9,349,373 B1 | 5/2016 | Williams et al. |
| 9,571,652 B1 * | 2/2017 | Zeppenfeld ............ H04L 9/3231 |
| 10,121,488 B1 * | 11/2018 | Drews ..................... G10L 21/02 |
| 10,477,012 B2 | 11/2019 | Rao et al. |
| 2001/0026632 A1 | 10/2001 | Tamai |
| 2001/0036257 A1 * | 11/2001 | McMahon ............ H04M 3/436 379/88.01 |
| 2002/0022474 A1 | 2/2002 | Blom et al. |
| 2002/0099649 A1 | 7/2002 | Lee et al. |
| 2003/0009333 A1 | 1/2003 | Sharma et al. |
| 2003/0050780 A1 | 3/2003 | Rigazio |
| 2003/0050816 A1 | 3/2003 | Givens et al. |
| 2003/0063133 A1 | 4/2003 | Foote et al. |
| 2003/0097593 A1 | 5/2003 | Sawa et al. |
| 2003/0147516 A1 | 8/2003 | Lawyer et al. |
| 2003/0203730 A1 | 10/2003 | Wan et al. |
| 2003/0208684 A1 | 11/2003 | Camacho et al. |
| 2003/0229492 A1 * | 12/2003 | Nolan ..................... G10L 17/06 704/E17.007 |
| 2004/0029087 A1 | 2/2004 | White |
| 2004/0105006 A1 | 6/2004 | Lazo et al. |
| 2004/0111305 A1 | 6/2004 | Gavan et al. |
| 2004/0131160 A1 | 7/2004 | Mardirossian |
| 2004/0143635 A1 | 7/2004 | Galea |
| 2004/0164858 A1 | 8/2004 | Lin |
| 2004/0167964 A1 | 8/2004 | Rounthwaite et al. |
| 2004/0169587 A1 | 9/2004 | Washington |
| 2004/0203575 A1 | 10/2004 | Chin et al. |
| 2004/0240631 A1 | 12/2004 | Broman et al. |
| 2004/0257444 A1 | 12/2004 | Maruya et al. |
| 2005/0010411 A1 | 1/2005 | Rigazio |
| 2005/0043014 A1 | 2/2005 | Hodge |
| 2005/0076084 A1 | 4/2005 | Loughmiller et al. |
| 2005/0125226 A1 | 6/2005 | Magee |
| 2005/0125339 A1 | 6/2005 | Tidwell et al. |
| 2005/0185779 A1 | 8/2005 | Toms |
| 2005/0273442 A1 | 12/2005 | Bennett et al. |
| 2006/0013372 A1 | 1/2006 | Russell |
| 2006/0106605 A1 | 5/2006 | Saunders et al. |
| 2006/0107296 A1 | 5/2006 | Mock et al. |
| 2006/0149558 A1 | 7/2006 | Kahn |
| 2006/0161435 A1 | 7/2006 | Atef et al. |
| 2006/0212407 A1 | 9/2006 | Lyon |
| 2006/0212925 A1 | 9/2006 | Shull et al. |
| 2006/0248019 A1 | 11/2006 | Rajakumar |
| 2006/0251226 A1 | 11/2006 | Hogan et al. |
| 2006/0277043 A1 | 12/2006 | Tomes et al. |
| 2006/0282660 A1 | 12/2006 | Varghese et al. |
| 2006/0285665 A1 * | 12/2006 | Wasserblat ......... G06Q 20/4016 379/114.14 |
| 2006/0289622 A1 | 12/2006 | Khor et al. |
| 2006/0293891 A1 | 12/2006 | Pathuel |
| 2007/0041517 A1 | 2/2007 | Clarke et al. |
| 2007/0071206 A1 | 3/2007 | Gainsboro et al. |
| 2007/0074021 A1 | 3/2007 | Smithies et al. |
| 2007/0100608 A1 | 5/2007 | Gable et al. |
| 2007/0106517 A1 | 5/2007 | Cluff et al. |
| 2007/0124246 A1 | 5/2007 | Lawyer et al. |
| 2007/0244702 A1 | 10/2007 | Kahn et al. |
| 2007/0280436 A1 | 12/2007 | Rajakumar |
| 2007/0282605 A1 | 12/2007 | Rajakumar |
| 2007/0288242 A1 | 12/2007 | Spengler |
| 2008/0010066 A1 | 1/2008 | Broman et al. |
| 2008/0052164 A1 | 2/2008 | Abifaker |
| 2008/0114612 A1 | 5/2008 | Needham et al. |
| 2008/0181417 A1 | 7/2008 | Pereg et al. |
| 2008/0195387 A1 | 8/2008 | Zigel et al. |
| 2008/0222734 A1 | 9/2008 | Redlich et al. |
| 2008/0293396 A1 * | 11/2008 | Barnes ............... H04M 3/42221 455/418 |
| 2009/0033519 A1 | 2/2009 | Shi et al. |
| 2009/0046841 A1 | 2/2009 | Hodge |
| 2009/0059007 A1 | 3/2009 | Wagg et al. |
| 2009/0106846 A1 | 4/2009 | Dupray et al. |
| 2009/0116703 A1 | 5/2009 | Schultz |
| 2009/0119106 A1 | 5/2009 | Rajakumar et al. |
| 2009/0147939 A1 | 6/2009 | Morganstein et al. |
| 2009/0152343 A1 * | 6/2009 | Carter ................. G06Q 10/0637 235/379 |
| 2009/0247131 A1 | 10/2009 | Champion et al. |
| 2009/0254971 A1 | 10/2009 | Herz et al. |
| 2009/0304374 A1 | 12/2009 | Fruehauf et al. |
| 2009/0319269 A1 | 12/2009 | Aronowitz |
| 2010/0086108 A1 | 4/2010 | Jaiswal et al. |

(56) References Cited

U.S. PATENT DOCUMENTS

| | | | |
|---|---|---|---|
| 2010/0106502 A1* | 4/2010 | Farrell | G10L 17/24 704/E17.001 |
| 2010/0114744 A1 | 5/2010 | Gonen | |
| 2010/0121644 A1 | 5/2010 | Glasser | |
| 2010/0131273 A1 | 5/2010 | Aley-Raz et al. | |
| 2010/0228656 A1 | 9/2010 | Wasserblat et al. | |
| 2010/0303211 A1 | 12/2010 | Hartig | |
| 2010/0305946 A1 | 12/2010 | Gutierrez | |
| 2010/0305960 A1 | 12/2010 | Gutierrez | |
| 2010/0329546 A1 | 12/2010 | Smith | |
| 2011/0004472 A1 | 1/2011 | Zlokarnik | |
| 2011/0026689 A1 | 2/2011 | Metz et al. | |
| 2011/0069172 A1 | 3/2011 | Hazzani | |
| 2011/0141276 A1 | 6/2011 | Borghei | |
| 2011/0191106 A1 | 8/2011 | Khor et al. | |
| 2011/0206198 A1 | 8/2011 | Freedman et al. | |
| 2011/0255676 A1 | 10/2011 | Marchand et al. | |
| 2011/0282661 A1 | 11/2011 | Dobry et al. | |
| 2011/0282778 A1 | 11/2011 | Wright et al. | |
| 2011/0320484 A1 | 12/2011 | Smithies et al. | |
| 2012/0053939 A9 | 3/2012 | Gutierrez et al. | |
| 2012/0054202 A1 | 3/2012 | Rajakumar | |
| 2012/0072453 A1 | 3/2012 | Guerra et al. | |
| 2012/0245941 A1* | 9/2012 | Cheyer | G10L 17/24 704/E15.004 |
| 2012/0249328 A1 | 10/2012 | Xiong | |
| 2012/0253805 A1 | 10/2012 | Rajakumar et al. | |
| 2012/0254243 A1 | 10/2012 | Zeppenfeld et al. | |
| 2012/0263285 A1 | 10/2012 | Rajakumar et al. | |
| 2012/0284026 A1 | 11/2012 | Cardillo et al. | |
| 2013/0132091 A1 | 5/2013 | Skerpac | |
| 2013/0163737 A1 | 6/2013 | Dement et al. | |
| 2013/0197912 A1 | 8/2013 | Hayakawa et al. | |
| 2013/0253919 A1 | 9/2013 | Gutierrez et al. | |
| 2013/0266127 A1* | 10/2013 | Schachter | G10L 25/48 379/88.01 |
| 2013/0283378 A1 | 10/2013 | Costigan et al. | |
| 2013/0300939 A1 | 11/2013 | Chou et al. | |
| 2014/0007210 A1 | 1/2014 | Murakami et al. | |
| 2014/0169547 A1* | 6/2014 | Murgai | H04M 3/2218 379/265.03 |
| 2014/0214676 A1 | 7/2014 | Bukai | |
| 2014/0222678 A1 | 8/2014 | Sheets et al. | |
| 2014/0230032 A1 | 8/2014 | Duncan | |
| 2014/0254778 A1 | 9/2014 | Zeppenfeld et al. | |
| 2014/0334611 A1* | 11/2014 | Barnes | H04M 3/51 379/68 |
| 2015/0055763 A1* | 2/2015 | Guerra | H04M 3/4936 379/88.02 |
| 2015/0256677 A1* | 9/2015 | Konig | H04M 3/5233 379/265.09 |
| 2015/0381801 A1 | 12/2015 | Rajakumar et al. | |
| 2016/0125884 A1* | 5/2016 | Timem | G10L 17/22 704/273 |
| 2016/0343375 A1* | 11/2016 | Williams | G10L 17/06 |
| 2016/0365095 A1* | 12/2016 | Lousky | G10L 17/04 |
| 2017/0118340 A1* | 4/2017 | Kumar | H04M 3/42221 |
| 2017/0140760 A1* | 5/2017 | Sachdev | G10L 17/06 |
| 2017/0269899 A1* | 9/2017 | Spiessbach | G06F 40/134 |
| 2018/0014189 A1 | 1/2018 | Ellison et al. | |
| 2018/0075454 A1 | 3/2018 | Claridge et al. | |
| 2018/0082689 A1* | 3/2018 | Khoury | H04M 1/271 |
| 2018/0152445 A1 | 5/2018 | Ye et al. | |
| 2018/0181741 A1 | 6/2018 | Whaley | |
| 2018/0240463 A1* | 8/2018 | Perotti | G10L 17/22 |
| 2019/0037081 A1* | 1/2019 | Rao | H04M 7/0078 |
| 2019/0050545 A1* | 2/2019 | Keret | G06F 21/32 |

FOREIGN PATENT DOCUMENTS

| | | |
|---|---|---|
| EP | 2437477 | 4/2012 |
| JP | 2004-193942 | 7/2004 |
| JP | 2006-038955 | 9/2006 |
| WO | 2000/077772 | 12/2000 |
| WO | 2004/079501 | 9/2004 |
| WO | 2006/013555 | 2/2006 |
| WO | 2007/001452 | 1/2007 |
| WO | 2010/116292 | 10/2010 |
| WO | 2014/205227 | 12/2014 |

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.

Asokan, N., et al., "Man-in-the-Middle in Tunneled Authentication Protocols," Draft version 1.3 (latest public version: http://eprint.iacr.org/2002/163/, Nov. 11, 2002, 15 pages.

Cohen, I., "Noise Spectrum Estimation in Adverse Environment: Improved Minima Controlled Recursive Averaging," IEEE Transactions on Speech and Audio Processing, vol. 11, No. 5, 2003, pp. 466-475.

Cohen, I., et al., "Spectral Enhancement by Tracking Speech Presence Probability in Subbands," Proc. International Workshop in Hand-Free Speech Communication (HSC'01), 2001, pp. 95-98.

ETSI TS 102 232-5 v2.1.1, "Lawful Interception (LI); Handover Interface and Service Specific Details (SSD) for IP delivery; Part 5: Service-specific details for IP Multimedia Services," Feb. 2007, 25 pages.

ETSI TS 102 657 v1.4.1, "Lawful Interception (LI); Retained data handling; Handover interface for the request and delivery of retained data," Dec. 2009, 92 pages.

Girardin, Fabien, et al., "Detecting air travel to survey passengers on a worldwide scale," Journal of Location Based Services, 26 pages.

Hayes, M.H., "Statistical Digital Signal Processing and Modeling," J. Wiley & Sons, Inc., New York, 1996, 200 pages.

Lailler, C., et al., "Semi-Supervised and Unsupervised Data Extraction Targeting Speakers: From Speaker Roles to Fame?" Proceedings of the First Workshop on Speech, Language and Audio in Multimedia (SLAM), Marseille, France, 2013, 6 pages.

Meyer, Ulrike, et al., "On the Impact of GSM Encryption and Man-in-the-Middle Attacks on the Security of Interoperating GSM/UMTS Networks," IEEE, 2004, 8 pages.

Schmalenstroeer, J., et al., "Online Diarization of Streaming Audio-Visual Data for Smart Environments," IEEE Journal of Selected Topics in Signal Processing, vol. 4, No. 5, 2010, 12 pages.

Strobel, Daehyun, "IMSI Catcher," Seminararbeit Ruhr-Universität Bochum, Chair for Communication Security, Prof. Dr.-Ing. Christof Paar, Jul. 13, 2007, 28 pages.

Vedaldi, Andrea, "An implementation of SIFT detector and descriptor," University of California at Los Angeles, 7 pages.

\* cited by examiner

SYSTEMS AND METHODS FOR CUSTOMER AUTHENTICATION BASED ON AUDIO-OF-INTEREST

BACKGROUND

Customer authentication and identification is important to a variety of industries. In an environment such as a call center, typically customers are identified based on the telephone phone number or account number that they used to contact the call center and/or based on the name that they provided to an agent. The customers are then authenticated (i.e., is the customer who they say they are) by asking the customers to answer secret questions, or by using two factor authentication.

However, current methods for customer identification and authentication are cumbersome and may be susceptible to manipulation by bad actors. For example, with respect to identification, a bad actor may spoof the phone number of a known customer and may pretend to be the customer when speaking with the agent. With respect to authentication, the bad actor may have learned the answer to the secret questions or other customer information using social engineering. While two factor authentication provides enhanced authentication, many customers have not set it up, or may find it cumbersome to use, which may lead to customer frustration and a poor call center experience. Therefore, what is needed is a way to improve customer identification and authentication, without providing additional burdens on the customer.

SUMMARY

In one embodiment, certain words or phrases spoken by customers during calls to a call center are used to identify or authenticate the user. Words or phases such as a customer's name, or an account number or telephone number, are selected for a customer. Recordings of the selected words or phrases spoken by the customer during previous calls are used to generate voiceprints that are stored and associated with the customer. Later, when the customer calls the call center, instances of the customer speaking the selected words are extracted from the call (referred to herein as "audio-of-interest") and are compared against the voiceprints stored for the customer. If the voiceprints match the audio-of-interest the customer is authenticated. The extracted audio-of-interest can be further used to identify the customer by matching the extracted audio-of-interest against voiceprints stored for multiple customers. The extracted audio-of-interest can be further compared against voiceprints stored for known bad actors or "fraudsters" to identify and prevent fraud.

As will be discussed further below, the embodiments described herein provide many benefits over prior systems for authentication and identification. First, by authenticating or identifying a customer using audio-of-interest extracted from the call, the customer is not required to actively participate in the authentication or identification process during the call. For example, the customer is no longer expected to provide information such as their address or answers to long forgotten security questions. Second, because the voiceprints for each customer may be generated automatically for a customer based on customer interactions, the customer is not required to participate in a separate training phase or session where the customer is asked to repeatedly speak selected words and phrases. As a result of the benefits of the embodiments described herein, the overall call experience for customers is improved, the average call length is reduced, and the detection of fraudulent activities is improved.

In one embodiment, a system for authenticating and identifying customers is provided. The system includes one or more processors and a memory communicably coupled to the one or more processors. The memory stores an interest module and a biometrics module. The interest module may include instructions that when executed by the one or more processors cause the one or more processors to: receive a call, wherein the call is associated with a customer; and extract audio-of-interest from the received call. The biometrics module includes instructions that when executed by the one or more processors cause the one or more processors to: receive the audio-of-interest; retrieve one or more voiceprints associated with the customer; based on the one or more voiceprints and the audio-of-interest, determine if the customer is authenticated; and if it is determined that the customer is authenticated, transmitting a message that the customer is authenticated.

Embodiments may include some or all of the following features. The biometrics module may further include instructions that when executed by the one or more processors cause the one or more processors to: if it is determined that the customer is not authenticated, perform a secondary authentication. Determining if the customer is authenticated may include: determining that one or more of the one or more voiceprints associated with the customer matches at least a portion of the audio-of interest with a confidence that satisfies a threshold confidence; and determining that the customer is authenticated in response to determining that the confidence satisfies the threshold confidence. The interest module may further include instructions that when executed by the one or more processors cause the one or more processors to: detect that audio-of-interest is being spoken by the customer; and extract the audio-of-interest from the received call in response to detecting that the audio-of-interest is being spoken. The interest module may further include instructions that when executed by the one or more processors cause the one or more processors to: determine that audio-of-interest is likely to be spoken by the customer based on a workflow associated with the call; and extract the audio-of-interest from the received call in response to determining that the audio of interest is likely to be spoken by the customer. The audio-of-interest may include one or more words or phrases spoken by the customer during the call. The audio-of-interest may include a non-consecutive sequence of words or phrases spoken by the customer during the call. The biometrics module may further include instructions that when executed by the one or more processors cause the one or more processors to: receive the audio-of-interest; retrieve one or more voiceprints associated with each customer of a plurality of customers; based on the one or more voiceprints and the audio-of-interest, identify the customer associated with the call from among the plurality of customers; and transmit a message that the customer is identified. The biometrics module may further include instructions that when executed by the one or more processors cause the one or more processors to: receive the audio-of-interest; retrieve one or more voiceprints associated with fraudulent customers of a plurality of customers; based on the one or more voiceprints and the audio-of-interest, identify the customer associated with the call as a fraudulent customer; and transmit a message that the customer is a fraudulent customer. Extracting audio-of-interest from the received call may include extracting audio-of-interest from a recording of the received call. Extracting audio-of-interest from the received call comprises extracting audio-of-interest from the received call in real time.

In an embodiment, a method for authenticating and identifying customers is provided. The method includes: receiving a call, wherein the call is associated with a customer; extracting audio-of-interest from the received call; retrieving one or more voiceprints associated with the customer; based on the one or more voiceprints and the audio-of-interest, determining if the customer is authenticated; and if it is determined that the customer is authenticated, transmitting a message that the customer is authenticated.

Embodiments may include some or all of the following features. The method may further include: if it is determined that the customer is not authenticated, performing a secondary authentication. Determining if the customer is authenticated may include: determining that one or more of the one or more voiceprints associated with the customer matches at least a portion of the audio-of interest with a confidence that satisfies a threshold confidence; and determining that the customer is authenticated in response to determining that the confidence satisfies the threshold confidence. The method may further include: detecting that audio-of-interest is being spoken by the customer; and extracting the audio-of-interest from the received call in response to detecting that the audio-of-interest is being spoken. The method may further include: determining that audio-of-interest is likely to be spoken by the customer based on a workflow associated with the call; and extracting the audio-of-interest from the received call in response to determining that the audio of interest is likely to be spoken by the customer. The audio-of-interest may include one or more words or phrases spoken by the customer during the call. The audio-of-interest may include a non-consecutive sequence of words or phrases spoken by the customer during the call. The method may further include: receiving the audio-of-interest; retrieving one or more voiceprints associated with each customer of a plurality of customers; based on the one or more voiceprints and the audio-of-interest, identifying the customer associated with the call from among the plurality of customers; and transmitting a message that the customer is identified.

In an embodiment, a non-transitory computer-readable medium is provided. The medium includes instructions stored thereon that when executed by a processor cause the processor to: receive a call, wherein the call is associated with a customer; extract audio-of-interest from the received call; retrieve one or more voiceprints associated with the customer; based on the one or more voiceprints and the audio-of-interest, determine if the customer is authenticated; and if it is determined that the customer is authenticated, transmit a message that the customer is authenticated.

In an embodiment, a system for authenticating and identifying customers is provided. The system includes an interest module and a biometrics module. The biometrics module: receives the audio-of-interest; receives zero or more voiceprints for a customer; creates or enhances the voiceprints for said customer to include additional audio-of-interest; and stores the voiceprint for later usage.

Embodiments may include some or all of the following features. The voiceprint may not become active for verification until the associated customer is verified and not a fraudulent actor. The voiceprint may be originally created on passive biometrics using the audio-of-interest comprising of the whole call and later enhanced to include other more specific audio-of-interest voiceprints. The voiceprint may become active for verification based on a 2-factor authentication or other secondary authentication method. The voiceprint may become active after it passes a threshold for accuracy and performance measure. The added voiceprint may be enhanced with audio specific to a device or medium with different audio qualities.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
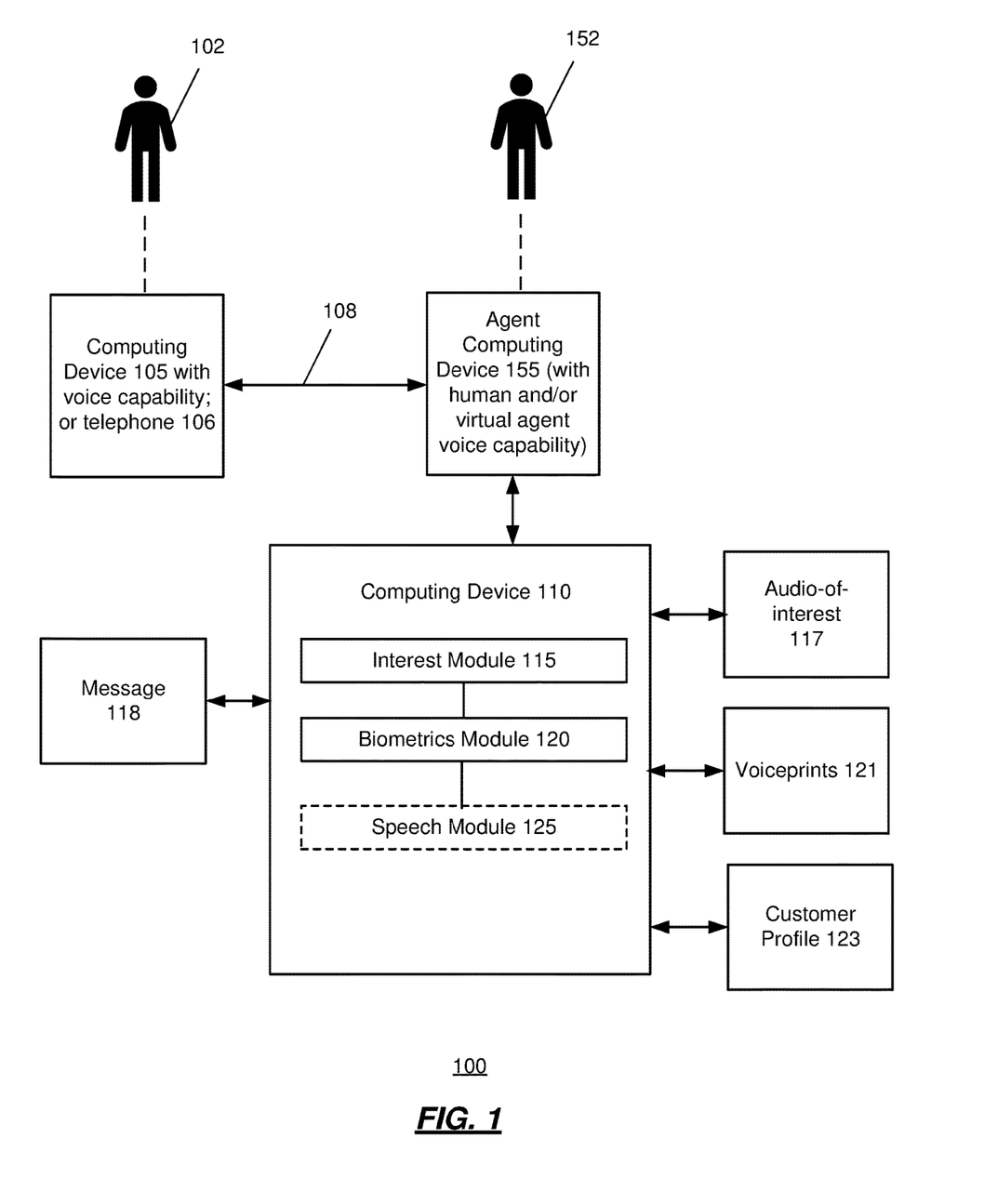
FIG. 1 is an illustration of an exemplary environment for providing customer identification and authentication.

FIG. 1 is an illustration of an environment 100 for authenticating and identifying callers. The environment 100 may be implemented by a call center or any other entity that receives calls from customers or clients. A customer 102 may use a computing device 105 (or a telephone 106) to initiate a call with an agent 152 associated with the environment 100. The agent 152 may receive the call via a channel 108 such as a VOIP line, POTS line, or a cellular channel. Any channel suitable for voice communication may be used. Note as used herein call may refer to the call received from the customer or a copy of the call received from the customer.

The agent 152 may receive the call from the customer 102 on an agent computing device 155. The agent computing device 155 may be equipped with both human and virtual voice agent capabilities.

Besides the agent 152, the call may also be received (at the same time or later) by a computing device 110 associated with the call center environment 100. The computing device 110 may provide one or more call center services to the customer 102 such as interactive voice response services ("IVR") where the user may be presented with an automated system that may determine the optimal agent 152 to direct the call, may determine the identity of the customer 102, or may retrieve other information from the customer in an automated way.

Figure 5:
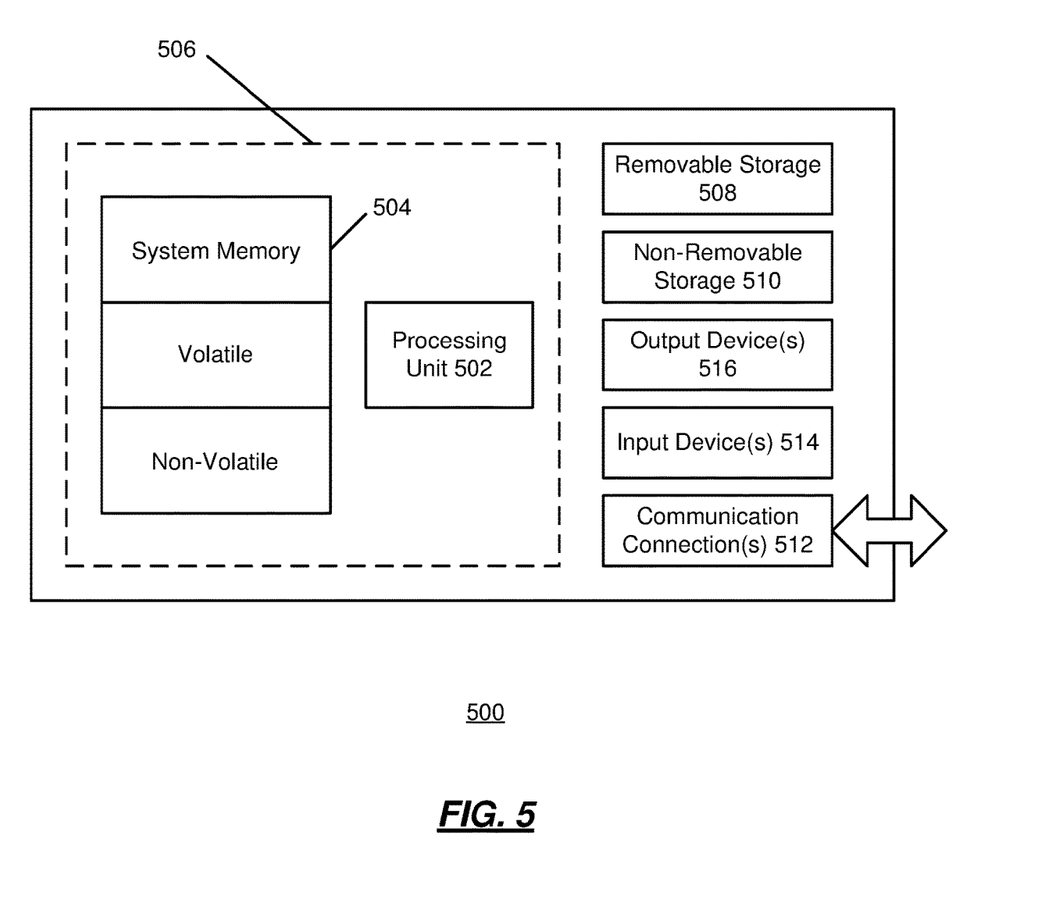
FIG. 5 shows an exemplary computing environment in which example embodiments and aspects may be implemented.

As may be appreciated, the computing device 105, agent computing device 155, and the computing device 110 may each be implemented by one or more general purpose computing devices such as the computing device 500 illustrated with respect to FIG. 5. Depending on the embodiment, the computing device 110 may be part of a voice recorder or other device performing functions in a call center.

To authenticate and identify the customers 102, the computing device 110 may include one or more modules. As illustrated, these modules include an interest module 115 and a biometrics module 120. More or fewer modules may be supported. Depending on the implementation, some or all of the modules 115 and 120 may be implemented the same computing device 110, or by some combination of computing devices 110. In addition, some or all of the modules 115 and 120 may be implemented by a cloud-based computing system.

In general, one way to authenticate a customer 102 using voice is referred to as active voice authentication. Traditionally, for active voice authentication, one or more voiceprints 121 are generated for a customer 102 by having the customer 102 train the system by repeatedly speaking one or more words or phrases to the call center during a training phase. Later, when the customer 102 calls the call center the customer 102 is asked to repeat the one or more words or phrases in order to authenticate the user. While active voice authentication is effective, requiring the user to train the system is burdensome and leads to a low participation rate.

Another common way to authenticate a customer 102 using voice is referred to as passive voice authentication. For passive voice authentication, a recording of the customer 102 speaking is used to create a general representation of how the customer 102 speaks that is unrelated to any particular word or phrase. When a customer 102 calls the call center, their speaking voice is processed with the representation to authenticate the customer 102. Passive voice authentication does not require an active training phase where the customer 102 is required to speak certain words or phrases which is an improvement on active voice authentication. However, passive voice authentication requires a large amount of spoken voice data from a customer 102 to authenticate, which may result in a significant delay from when a call begins and when the customer 102 is authenticated.

To provide authentication and identification services using active voice authentication but without the drawbacks associated with an active training phase, the interest module 115 and biometrics module 120 may use what are referred to herein as audios-of-interest 117. An audio-of-interest 117 may be a word or phrase that is typically spoken by a customer 102 during a call. Examples include the name of the customer, the city or address associated with the customer, a telephone number associated with a customer, or an account number associated with a customer. Other examples of audio-of-interest 117 may include common words such as "yes", "no", "thank you", or "okay." The audio-of-interest may not be words in the spoken language. Phonemes (or a basic unit of sound) may be pulled from words matching. English has a finite number (44) of phonemes which all words are made up from. Using this the training words for a voiceprint need not be the same words used for verification.

The audio-of-interest 117 may be used to quickly authenticate and/or identify a customer 102 on a call based on the voice of the customer 102. In some embodiments, the audios-of-interest 117 may be selected to be a word or phrase that is typically spoken by a customer 102 at around the beginning of a call. This may ensure that the customer 102 can be quickly authenticated or identified at the beginning of the call.

Depending on the embodiment, the audios-of-interest 117 may be consecutive or non-consecutive words or phrases. For example, a consecutive audio-of-interest 117 may be an account number, whereas a non-consecutive audio-of-interest 117 may be the first, third, and fifth digit of the account number.

In some embodiments, the audio-of-interest 117 may be most of, or a large portion of, the call. In such embodiments, the audio-of-interest 117 may function similarly as a passive biometric voiceprint.

In some embodiments, each customer 102 may use the same audio-of-interest 117. For example, each customer 102 may use their name as their associated audio-of-interest 117 or may use their account number as their audio-of-interest 117. Alternatively, customers 102 may have different audios-of-interest 117. For example, one customer 102 may use their first name as their audio-of-interest 117, while another customer 102 may use their last name as their audio-of-interest 117. In embodiments where different audios-of-interest 117 are used by customers 102, the particular audio-of-interest 117 used by a customer 102 may be identified in a customer profile 123 associated with the customer 102, for example.

In some embodiments, when a customer 102 makes their first call with a call center, after authenticating the customer 102 using two factor authentication or some other means, the interest module 115 may identify and extract voice data from the call corresponding to the audio-of-interest 117. For example, if the audio-of-interest 117 is the name of the customer 102, the interest module 115 may extract the audio-of-interest 117 from the call at or around the time that the customer 102 is saying their name. Depending on the embodiment, the interest module 115 may extract the voice data (and audio-of-interest 117) from the call in real-time, or near-real time. Alternatively, the interest module 115 may extract the voice data from a recording, or partial recording, of the call.

As may be appreciated, the audio-of-interest 117 is extracted from the normal back and forth conversation associated with the call. There is no explicit or required training phase where the customer 102 is asked to repeat the audio-of-interest 117.

The interest module 115 may process the extracted audio-of-interest 117 for a customer 102 and may generate and store one or more voiceprints 121 for the customer 102. A voiceprint 121 is a digital structure that is unique to a customer 102 and that can be later used to identify or authenticate the customer 102 when the customer 102 speaks the word or phase that corresponds to the audio-of-interest 117 that was used to create the voiceprint 121. Any method or technique for creating voiceprints 121 may be used.

In some implementations, rather than extract audio-of-interest 117 from a call, the interest module 115 may identify where in a particular recording of a call the audio-of-interest 117 is located. A pointer to the audio-of-interest 117 may then be stored by the interest module 115 along with some or all of the recording of the call.

In some implementations, voiceprints 121 associated with a customer 102 or account may relate to behavioral characteristics about how the customer 102 speaks or says certain phrases. For example, a customer 102 may have the behavior characteristics of always speaking each number of their phone number (i.e., "three", "zero", "zero", "eight", "zero", "five", "six"). Another customer may have the behavior characteristic of grouping certain digits of their phone number into larger numbers (i.e., "three-hundred", "eight", "zero", "five", "six"). As another example, a customer 102 may always say their zip code first when speaking their address. Other types of behavioral characteristics may be included.

In some embodiments, each audio-of-interest 117 for a customer 102 or account may be associated with a separate voice print 121. Alternatively, a single voiceprint 121 may be used that includes all of the audios-of-interest 117 that may be used for a customer 102. The voiceprint 121 may also include behavioral characteristics and any other information that may be used to authenticate a customer 102 such as face biometrics, fingerprints, etc.

The interest module 115 may use the stored voiceprints 121 to authenticate and/or identify customers 102. With respect to authentication, when a customer 102 initiates a call with the call center, the agent 152 (or an interactive voice response system ("IVR")) may initially identify the customer 102 on the call based on information indirectly or directly provided by the customer 102. For example, the customer 102 may be identified based on the telephone number that they used to place the call, or based on the name, address, or customer number that they provided to the agent 152 or IVR system.

The interest module 115 may continuously update or improve on the stored voiceprints 121 for each customer 102. After a customer 102 is authenticated using audio-of-interest 117, the interest module 115 may update some or all of the stored voiceprints 121 based on the audio-of-interest 117. As may be appreciated, overtime the voice associated with a customer 102 may change slightly. By continuously updating the stored voiceprints 121 using recent audios-of-interest 117 these changes may be reflected in the stored voiceprints 121.

The interest module 115 may extract the audio-of-interest 117 from the call. Depending on the embodiment and type of audio-of-interest 117, the interest module 115 may extract the audio-of-interest 117 based on a script or workflow associated with the call. As may be appreciated, most agents 152 and IVR systems use a workflow or script that specifies how the agent 152 and IVR system interact with the customer 102 including the questions that are asked during the call. Accordingly, the interest module 115 may use the script or workflow to determine a time or place in the call when the audio-of-interest 117 is likely to appear in the call and may extract the audio-of-interest 117 at the determined time and place. Any method may be used.

For example, for an audio-of-interest 117 of a customer 102 name, the workflow may indicate that the agent 152 asks the customer 102 to speak their name as the first question during the call. Accordingly, the interest module 115 may look at or around the time of the first question in the call for audio-of-interest 117 that corresponds to the customer 102 speaking their name. In another example, the interest module 115 may detect that agent computing device 155 has just displayed a text box that the agent 152 uses to enter the account number of the customer 102. Accordingly, the interest module 115 may determine that the customer has likely been asked their account number and may begin extracting audio-of-interest 117 from the call.

Alternatively, or in addition to the workflow, the interest module 115 may process the call using speech recognition to identify one or more portions of the call that likely correspond to the audio-of-interest 117. For example, where the audio-of-interest 117 is the customer number, the interest module 115 may use speech recognition to identify portions of the call where the customer is speaking numbers. The interest module 115 may extract the audio-of-interest 117 from the identified portions.

As may be appreciated, interest module 115 may use the workflow-based extraction in combination with the speech-recognition-based extraction. For example, where the audio-of-interest 117 is a customer number, the workflow may indicate that the customer 102 is asked to recite their customer number as the third question. Accordingly, the interest module 115 may use the speech recognition to identify portions of the call where the customer is speaking numbers after the third question.

In some embodiments, the computing device 110 may include an optional speech module 125. The speech module 125 may work with the interest module 125 to process audio and identify the audio-of-interest 117. The speech module 125 may use speech recognition to determine what questions are being asked by the agent 152 and may then determine when to extract the audio-of-interest 117 from the audio. As another example, where the audio-of-interest 117 is specific numbers being spoken by the customer 102, the speech module 125 may recognize when the specific numbers are being spoken by the customer 102 and may extract the numbers from the audio as the audio-of-interest 117.

The biometrics module 120 may receive the extracted audio-of-interest 117 from the interest module 115 and may use the extracted audio-of-interest 117 to authenticate the customer 102 associated with the call. In some embodiments, the biometrics module 120 may retrieve one or more voiceprints 121 associated with the customer 102 and may determine if the extracted audio-of-interest 117 matches any of the retrieved one or more voiceprints 121 associated with the customer 102. If the extracted audio-of-interest 117 matches any of the retrieved one or more voiceprints 121 associated with the customer 102, the biometrics module 120 may determine that the customer 102 is authenticated.

In other embodiments, the biometrics module 120 may determine if the extracted audio-of-interest 117 matches all of the retrieved one or more voiceprints 121 associated with the customer 102. And only when the extracted audio-of-interest 117 matches all of the retrieved one or more voiceprints 121 associated with the customer 102, may the biometrics module 120 determine that the customer 102 is authenticated.

Any method for determining if extracted audio-of-interest 117 matches a voiceprint 121 may be used. In some implementations, the biometrics module 120 may calculate a confidence that the extracted audio-of-interest 117 matches a voiceprint 121. If the calculated confidence satisfies a threshold confidence (e.g., is greater than or equal to the threshold confidence), then the biometrics module 120 may determine that the extracted audio-of-interest 117 matches the voiceprint 121. Else, the biometrics module 120 may determine the that the extracted-audio-of-interest 117 does not match the voiceprint 121. The threshold confidence may be set by a user or administrator, for example.

The biometrics module 120 may generate and transmit a message 118 indicating whether the customer 102 was authenticated based on the extracted audio-of-interest 117. The message 118 may be transmitted to the agent computing device 155 and displayed to the agent 152. Depending on the embodiment, if the message 118 indicates that the customer 102 could not be authenticated based on the audio-of-interest 117 the agent 152 may attempt to authenticate the customer 102 using other methods such as two factor authentication or by using security questions. Any method for authenticating a customer 102 may be used.

In addition to authentication, the interest module 115 and biometrics module 120 may further perform customer 102 identification using the stored voiceprints 121. In such embodiments, when a call is initially received by an agent 152 or IVR system, the interest module 115 may extract the audio-of-interest from the call as described above and may provide the extracted audio-of-interest 117 to the biometrics module 120. The biometrics module 120 may then identify the customer 102 by comparing the extracted audio-of-interest 117 with the stored voiceprints 121 associated with some or all of the known customers 120. If the extracted audio-of-interest 117 matches a voiceprint 121, then the biometrics module 120 may identify the customer 102 associated with the call as the customer 102 associated with the matching voiceprint 121. The biometrics module 120 may then send a message 118 to the agent 152 or IVR system indicating whether the customer 102 was identified, and if so, the identity of the customer 102. If the customer 102 could not be identified the agent 152 or IVR system may identify the customer 102 using different methods.

As may be appreciated, one benefit of identifying the customer 102 using the audio-of-interest 117 and the voiceprints 121 is that after the customer 102 is identified they are also authenticated. Accordingly, the amount of time required to both identify and authenticate the customer 102 is reduced, which may result in a reduced call time and an increased call experience for the customer 102. Reduced call times increases the overall number of calls that a call center can handle and may also reduce the overall number of agents 152 needed at the call center.

The interest module 115 and biometrics module 120 may further perform fraud detection using the stored voiceprints 121. In particular, the biometrics module 120 may determine if a customer 102 is likely a fraudulent customer 102 (i.e., a customer 102 or other individual that was previously associated with fraud or fraudulent activities). In such embodiments, when a call is initially received by an agent 152 or IVR system, the interest module 115 may extract the audio-of-interest 117 from the call as described above and may provide the extracted audio-of-interest 117 to the biometrics module 120. The biometrics module 120 may then compare the extracted audio-of-interest 117 with stored voiceprints 121 associated with known bad actors or fraudulent customers 102. If the extracted audio-of-interest 117 matches a stored voiceprint 121, then the biometrics module 120 may identify the customer 102 as a fraudulent customer 102. The biometrics module 120 may then send a message 118 to the agent 152 or IVR system indicating that the customer 102 is likely a fraudulent customer 102. The agent 152 or IVR system may then take actions such as escalating the call to a fraud specialist, terminating the call, or whatever actions may be specified for fraudulent calls by the call center.

In some implementations, when a customer 102 cannot be authenticated by the computing device 110, any voiceprints 121 associated with the customer 102 may be considered by the biometrics module 120 when detecting fraud. While the customer 102 may not be a known fraudulent customer, the authentication failure may indicate that the customer 102 may be attempting to breech one or more accounts. If the biometrics module 120 recognizes the customer 102 attempting to access another account at a later time, the voiceprints 121 associated with the customer 102 may be added by the biometrics module 120 to the list of known bad actors or fraudulent customers 102.

In some embodiments, where the audio-of-interest 117 is passive biometric voiceprint, different thresholds may be used by the biometrics module 120 for verification, identification, and fraud detection or prevention.

Note that the authentication and fraud detection processes described above may not be performed in any particular order with respect to each other and may in fact be performed at approximately the same time. Accordingly, when a customer 102 calls the agent computing device 155, the computing device 110 may begin the authentication process while the computing device 110 also begins the fraud detection process.

Note that the use of the computing device 110 (and interest module 115 and biometrics module 120) is not specifically limited to use within call centers. For example, a user may use a banking app on their smartphone. The banking app may include a biometrics module 120 that has access to, or stores, one or more voiceprints 121 associated with the user. The voice prints 121 may have been learned by the computing device 110 at the call center as described above. When the user attempts to use the app, the interest module 115 also included in the app may prompt the user to speak or say the audio-of-interest 117. The biometrics module 120 may then authenticate the user using the voiceprints 121 and the audio-of-interest 117. The user may then be allowed or denied access to the app based on the authentication.

In another example, a customer may go to a bank branch to speak with a teller. As the customer speaks with the teller, a microphone records audio from the conversation. An interest module 115 associated with the bank branch or a computing device 110 of the teller may extract the audio-of-interest 117 from the recorded audio, and the biometrics module 120 may authenticate the customer using the audio-of-interest 117 and one or more stored voiceprints 121 of the customer. Once the customer is authenticated, the computing device 110 may display a message to the teller.

As may be appreciated, the authentication system described herein may be incorporated into a variety of applications and scenarios where authenticating users based on voice may be useful. For example, the system could be used to authenticate users before they enter airplanes, trains, buses, or other public transportation systems. The system could similarly be used to authenticate residents of a building, or office workers, before the enter the building. The system could be used to authenticate credit card or ATM transactions.

Figure 2:
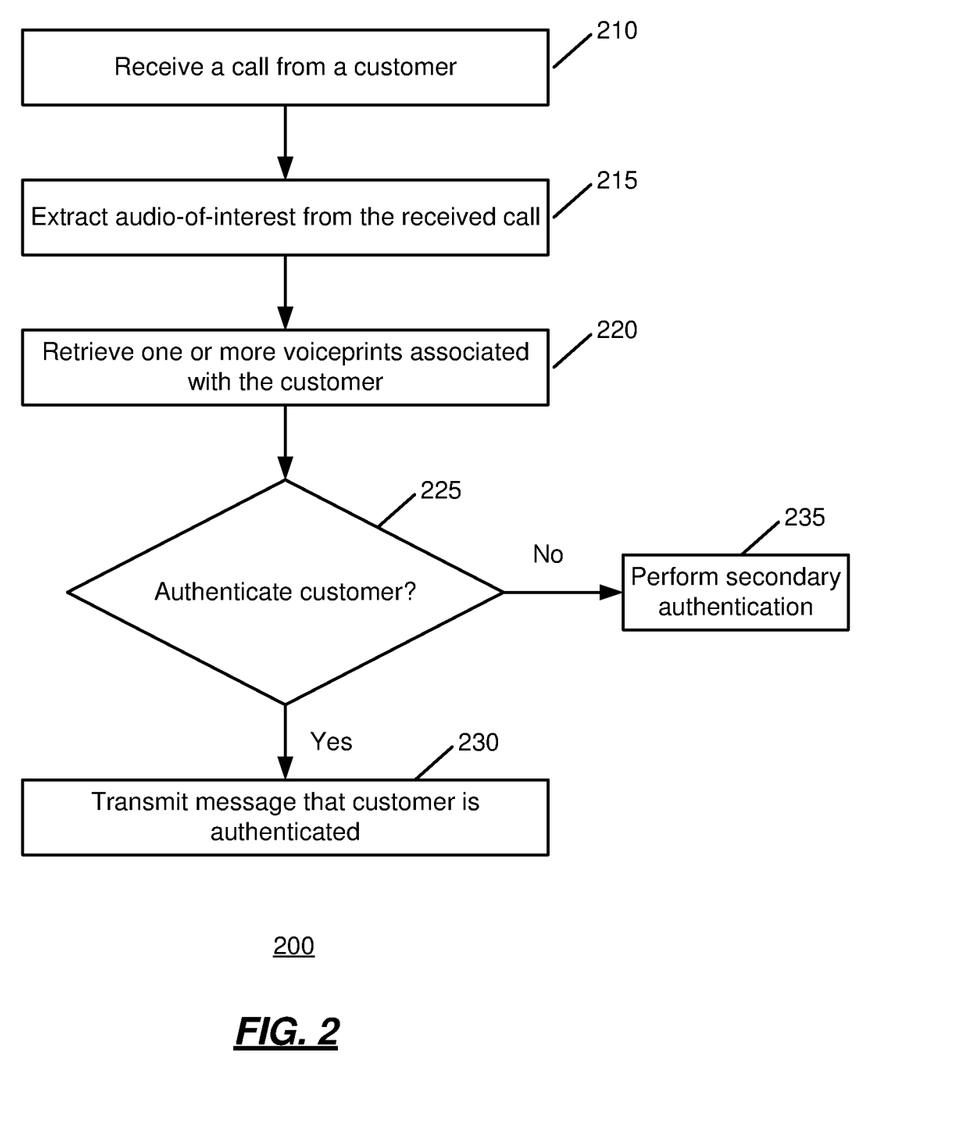
FIG. 2 is an operational flow of an implementation of a method for authenticating a customer.

FIG. 2 is an illustration of a method 200 for authenticating a customer 102. The method 200 may be performed by the interest module 115 and/or the biometrics module 130 of the computing device 110.

At 210, a call is received from a customer. The call may be received from a customer 102 by an agent 152, or IVR system, associated with an agent computing device 155. Depending on the embodiment, the agent 152 or IVR system may have identified the customer 102 using information such as the telephone number associated with the call or using information provided by the customer 102 such as a name, address, or account number, for example.

At 215, audio-of-interest 118 is extracted from the call. The audio-of-interest 118 may be extracted from the call by the interest module 115. The audio-of-interest 118 may be extracted from the call in real-time or may be extracted from a recording of the call that was provided to the interest module 115. The audio-of-interest 118 may comprise a recording of the customer 102 speaking a particular word or phrase that may be used to authenticate the customer 102.

At 220, one or more voiceprints associated with the customer 102 are retrieved. The one or more voiceprints 121 may be retrieved by the biometrics module 130. Each voiceprint 121 may have been generated by the biometrics module 130 from previous interactions with the associated customer 102. Depending on the embodiment, the voiceprints 121 may have been generated by an active voiceprint 121 generation process.

At 225, a determination is made as to whether the customer is authenticated. The determination may be made by the biometrics module 130 using the one or more voiceprints 121 associated with the customer 102 and the audio-of-interest 118 extracted for the customer 102 from the call. In some embodiments, the customer 102 is authenticated if at least a portion (or all) of the extracted audio-of-interest 118 matches a voiceprint 121 associated with the customer 102. If the customer 102 is authenticated, then the method 200 may continue at 230. Else, the method 200 may continue at 235.

At 230, a message that the customer is authenticated is transmitted. The message 118 may be transmitted to the agent 152 or IVR system by the biometrics module 130. After receiving the message 118 the agent 152, or IVR system, may proceed as if the customer 102 has been authenticated.

At 235, secondary authentication is performed. The secondary authentication may be performed by the agent 152 or the IVR system. Depending on the embodiment, the secondary authentication may include performing two step authentication or asking one or more security questions.

Figure 3:
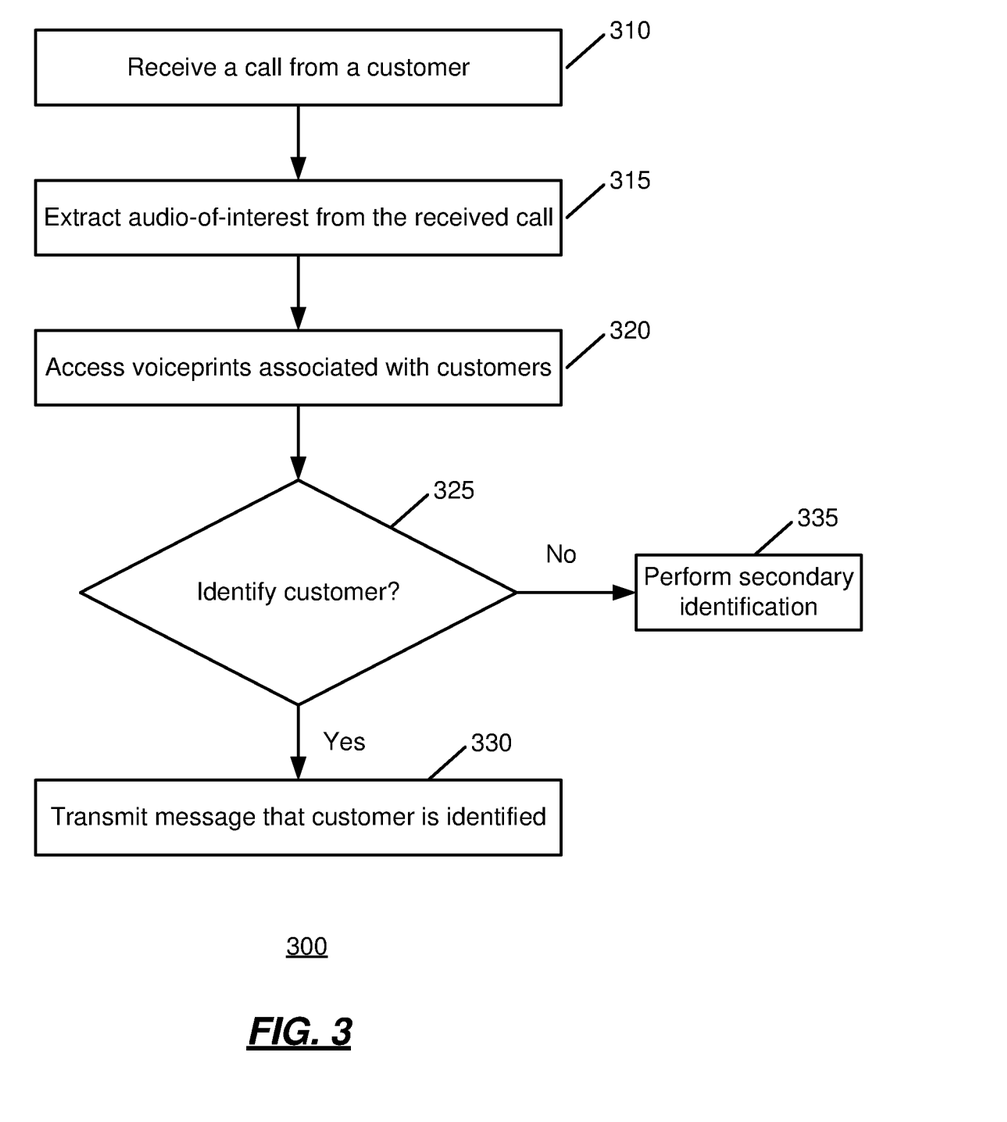
FIG. 3 is an operational flow of an implementation of a method for identifying a customer.

FIG. 3 is an illustration of a method 300 for identifying a customer 102. The method 300 may be performed by the interest module 115 and/or the biometrics module 130 of the computing device 110.

At 310, a call is received from a customer. The call may be received from a customer 102 by an agent 152, or IVR system, associated with an agent computing device 155. The customer 102 may not have been identified by the agent 152 or IVR system.

At 315, audio-of-interest 118 is extracted from the call. The audio-of-interest 118 may be extracted from the call by the interest module 115. The audio-of-interest 118 may be extracted from the call in real-time or may be extracted from a recording of the call that was provided to the interest module 115. The audio-of-interest 118 may comprise a recording of the customer 102 speaking a particular word or phrase that may be used to authenticate the customer 102.

At 320, voiceprints associated with customers 102 are accessed. The voiceprints 121 may be accessed by the biometrics module 120. The voiceprints 121 may have been generated by the biometrics module 120 for each of the customers 120.

At 325, a determination is made as to whether the customer 102 is identified. The determination may be made by the biometrics module 130 using the accessed voiceprints 121 and the audio-of-interest 118 extracted for the customer 102 from the call. In some embodiments, the biometrics module 130 may attempt to match each of the accessed voiceprints 121 with the extracted audio-of-interest 118. If a voiceprint 121 matching the extracted audio-of-interest 118 is found, then the biometrics module 130 may identify the customer 102 associated with the call as the customer 102 associated with the matching voiceprint 121. If the customer 102 is identified, then the method 300 may continue at 330. Else, the method 300 may continue at 335.

At 330, a message that the customer is identified is transmitted. The message 118 may be transmitted to the agent 152 or IVR system by the biometrics module 130. Because the customer 102 was also authenticated by virtue of the matching voiceprint 121, the message 118 may further indicate that the customer 102 was also authenticated.

At 335, secondary identification is performed. The secondary identification may be performed by the agent 152, the IVR system, or other modules or systems. For example, the secondary identification may include asking the customer 102 to state their name or account number. Other examples the secondary identification may include passive voice biometrics and face biometrics. Other methods for customer identification and/or verification may be used.

Figure 4:
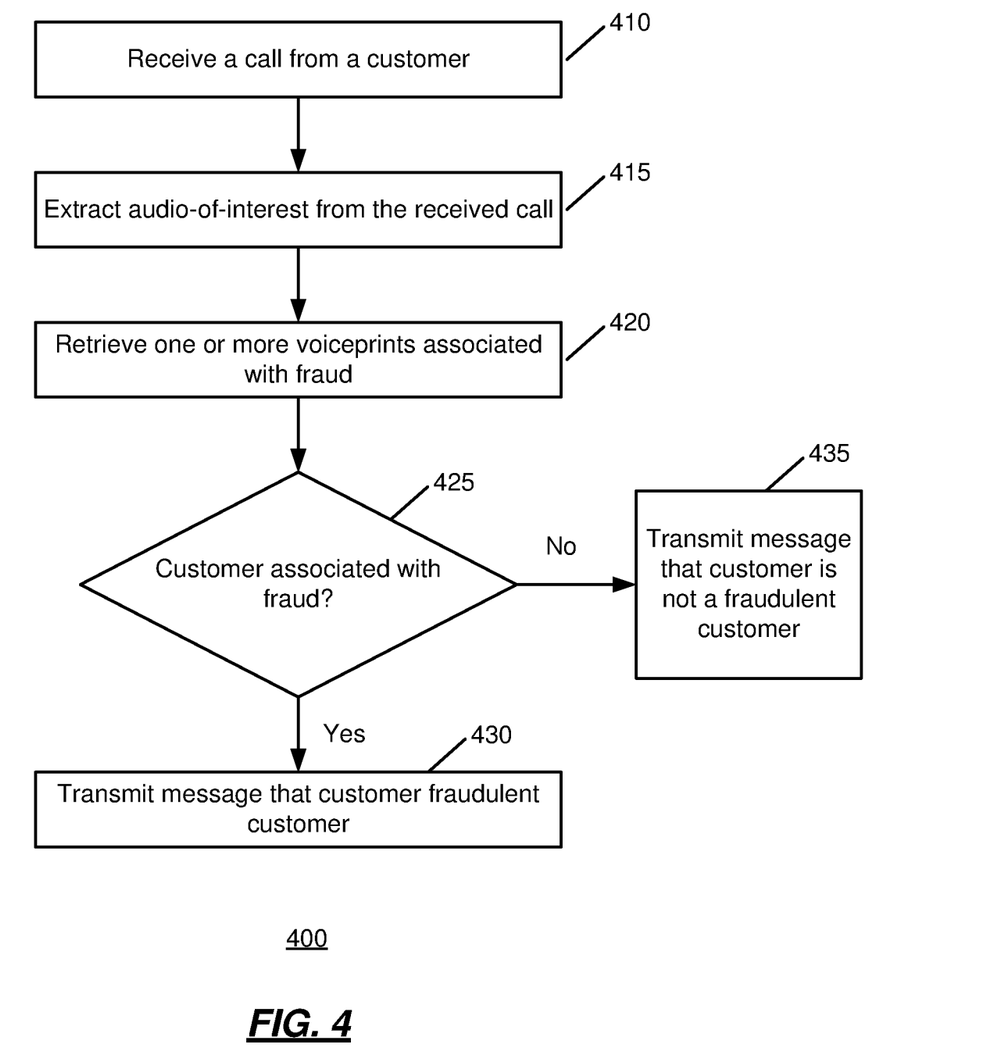
FIG. 4 is an operational flow of an implementation of a method for identifying fraudulent customers.

FIG. 4 is an illustration of a method 400 for determining if a customer is a fraudulent customer. The method 400 may be performed by the interest module 115 and/or the biometrics module 130 of the computing device 110.

At 410, a call is received from a customer. The call may be received from a customer 102 by an agent 152, or IVR system, associated with an agent computing device 155. Depending on the embodiment, the agent 152 or IVR system may have identified the customer 102 using information such as the telephone number associated with the call or using information provided by the customer 102 such as a name, address, or account number, for example.

At 415, audio-of-interest 118 is extracted from the call. The audio-of-interest 118 may be extracted from the call by the interest module 115. The audio-of-interest 118 may be extracted from the call in real-time, or may be extracted from a recording of the call that was provided to the interest module 115. The audio-of-interest 118 may comprise a recording of the customer 102 speaking a particular word or phrase that may be used to authenticate the customer 102.

At 420, one or more voiceprints associated with fraud are retrieved. The one or more voiceprints 121 may be retrieved by the biometrics module 130. Each voiceprint 121 may have been generated by the biometrics module 130 from interactions with known fraudulent customers 102. Depending on the embodiment, the biometrics module 130 may maintain a "blacklist" of fraudulent customers 102 along with one or more voiceprints 121 generated for each fraudulent customer 102. After a call associated with a customer 102 is determined to be fraudulent, any voiceprints 121 associated with the customer 102 may be added to the blacklist. If no such voiceprints 121 exist, the biometrics module 130 may generate voiceprints 121 for the customer 102 from the last call recorded for the customer 102.

At 425, a determination is made as to whether the customer is a fraudulent customer. The determination may be made by the biometrics module 130 using the retrieved voiceprints 121 associated with fraud. In some embodiments, if the extracted audio-of-interest 118 matches any of the voiceprints 121 associated with fraud, then the customer 102 may be determined to be a fraudulent customer 102. If the customer 102 is determined to be a fraudulent customer 102, then the method 400 may continue at 430. Else, the method 400 may continue at 435.

At 430, a message that the customer is a fraudulent customer is transmitted. The message 118 may be transmitted to the agent 152 or IVR system by the biometrics module 130. After receiving the message 118 the agent 152, or IVR system, may end the call, or may escalate the call to an agent 152 specializing in fraud.

At 435, a message that the customer is not a fraudulent customer is transmitted. The message 118 may be transmitted to the agent 152 or IVR system by the biometrics module 130. After receiving the message 118 the agent 152, or IVR system, may proceed with the call.

FIG. 5 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by the device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for authenticating and identifying customers comprising:
   one or more processors;
   a memory communicably coupled to the one or more processors and storing:
      an interest module including instructions that when executed by the one or more processors cause the system to:
         receive a call, wherein the call is associated with a customer of a plurality of customers;
         retrieve a customer profile associated with the customer;
         determine an audio-of-interest associated with the customer based on the customer profile, wherein each customer is associated with a different audio-of-interest;
         identify where the audio-of-interest is spoken by the customer in the received call based at least on (a) a customer workflow associated with the call, and (b) data being displayed on an agent computing device associated with the call; and
         store a pointer to the audio-of-interest with a recording of the received call; and
      a biometrics module including instructions that when executed by the one or more processors cause the system to:

retrieve the audio-of-interest from the received call using the stored pointer;
retrieve a plurality of voiceprints associated with the customer;
identify one or more behavioral characteristics associated with the plurality of voiceprints that relate to how the customer utters the audio-of-interest including at least one of a specific grouping of terms or numbers and a specific ordering of terms or numbers when providing requested identifying information;
based on the one or more behavioral characteristics, determine if the customer is authenticated;
if it is determined that the customer is authenticated, transmit a message that the customer is authenticated;
enhance the one or more voiceprints to include the audio-of-interest as an active voiceprint; and
store the enhanced one or more voiceprints for authenticating the customer during a subsequent call.

2. The system of claim 1, wherein the biometric module further includes instructions that when executed by the one or more processors cause the system to:
if it is determined that the customer is not authenticated, perform a secondary authentication.

3. The system of claim 1, wherein the biometrics module further includes instructions that when executed by the one or more processors cause the system to:
determine that one or more of the one or more voiceprints associated with the customer matches at least a portion of the audio-of interest with a confidence that satisfies a threshold confidence; and
determine that the customer is authenticated in response to determining that the confidence satisfies the threshold confidence.

4. The system of claim 1, wherein the interest module further includes instructions that when executed by the one or more processors cause the system to:
detect that the audio-of-interest is being spoken by the customer; and
extract the audio-of-interest from the received call in response to detecting that the audio-of-interest is being spoken.

5. The system of claim 1, wherein the interest module further includes instructions that when executed by the one or more processors cause the system to:
determine a time when the audio-of interest is likely to be spoken by the customer during the call based on a script associated with the call; and
extract the audio-of interest from the received call at the determined time in response to determining that the audio-of interest is likely to be spoken by the customer.

6. The system of claim 1, wherein the audio-of-interest comprises one or more words or phrases spoken by the customer during the call.

7. The system of claim 1, wherein the audio-of interest comprises a non-consecutive sequence of digits of an account number associated with the customer.

8. The system of claim 1, wherein the biometrics module further includes instructions that when executed by the one or more processors cause the system to:
receive the audio-of interest;
retrieve one or more voiceprints associated with each customer of a plurality of customers;
based on the one or more voiceprints and the audio-of-interest, identify the customer associated with the call from among the plurality of customers; and
transmit a message that the customer is identified.

9. The system of claim 1, wherein the biometrics module further includes instructions that when executed by the one or more processors cause the system to:
receive the audio-of interest;
retrieve one or more voiceprints associated with fraudulent customers of a plurality of customers;
based on the one or more voiceprints and the audio-of-interest, identify the customer associated with the call as a fraudulent customer; and
transmit a message that the customer is a fraudulent customer.

10. The system of claim 1, wherein the audio of interest comprises one or more phonemes.

11. A method for authenticating and identifying customers comprising:
receiving a call, wherein the call is associated with a customer of a plurality of customers;
retrieving a customer profile associated with the customer;
determining an audio-of-interest associated with the customer based on the customer profile, wherein each customer is associated with a different audio-of-interest;
identifying where the audio-of-interest is spoken by the customer in the received call based at least on (a) a customer workflow associated with the call, and (b) data being displayed on an agent computing device associated with the call;
storing a pointer to the audio-of-interest with a recording of the received call;
retrieving the audio-of-interest from the received call using the stored pointer;
retrieving a plurality of voiceprints associated with the customer;
identifying one or more behavioral characteristics associated with the plurality of voiceprints that relate to how the customer utters the audio-of-interest including at least one of a specific grouping of or numbers terms and a specific ordering of terms or numbers when providing requested identifying information;
based on the one or more behavioral characteristics, determining if the customer is authenticated;
if it is determined that the customer is authenticated, transmitting a message that the customer is authenticated;
enhancing the one or more voiceprints to include the audio-of-interest as an active voiceprint; and
storing the enhanced one or more voiceprints for authenticating the customer during a subsequent call.

12. The method of claim 11, further comprising:
if it is determined that the customer is not authenticated, performing a secondary authentication.

13. The methods of claim 11, wherein determining if the customer is authenticated comprises:
determining that one or more of the one or more voiceprints associated with the customer matches at least a portion of the audio-of interest with a confidence that satisfies a threshold confidence; and
determining that the customer is authenticated in response to determining that the confidence satisfies the threshold confidence.

14. The method of claim 13, wherein there are multiple threshold confidences and each threshold confidence is associated with a different allowed action.

15. The method of claim 11, further comprising:
identifying portions of the call where the customer is speaking numbers using voice recognition; and
extracting the audio-of-interest from the identified portions of the call.

16. The method of claim 11, further comprising:
determining that the audio-of-interest is likely to be spoken by the customer based on the customer workflow associated with the call; and
extracting the audio-of-interest from the received call in response to determining that the audio of interest is likely to be spoken by the customer.

17. The method of claim 11, wherein the audio-of-interest comprises a non-consecutive sequence of words or phrases spoken by the customer during the call.

18. The method of claim 11, further comprising:
receiving the audio-of-interest;
retrieving one or more voiceprints associated with each customer of a plurality of customers;
based on the one or more voiceprints and the audio-of-interest, identifying the customer associated with the call from among the plurality of customers; and
transmitting a message that the customer is identified.

19. A non-transitory computer-readable medium with instructions stored thereon that when executed by a processor of a processing system cause the processing system to perform a method, the method comprising:
receive a call, wherein the call is associated with a customer of a plurality of customers;
retrieve a customer profile associated with the customer;
determine an audio-of-interest associated with the customer based on the customer profile, wherein each customer is associated with a different audio-of-interest;
identify where the audio-of-interest is spoken by the customer in the received call based at least on (a) a customer workflow associated with the call, and (b) data being displayed on an agent computing device associated with the call;
store a pointer to the audio-of-interest with a recording of the received call;
retrieve the audio-of-interest from the received call using the stored pointer;
retrieve a plurality of voiceprints associated with the customer;
identify one or more behavioral characteristics associated with the plurality of voiceprints that relate to how the customer utters the audio-of-interest including at least one of a specific grouping of terms or numbers and a specific ordering of terms or numbers when providing requested identifying information;
based on the one or more behavioral characteristics, determine if the customer is authenticated;
if it is determined that the customer is authenticated, transmit a message that the customer is authenticated;
enhance the one or more voiceprints to include the audio-of-interest as an active voiceprint; and
store the enhanced one or more voiceprints for authenticating the customer during a subsequent call.

* * * * *